US009099833B2

(12) United States Patent
Mitchell et al.

(10) Patent No.: US 9,099,833 B2
(45) Date of Patent: Aug. 4, 2015

(54) MULTIPLEXER HAVING ASE SUPPRESSION

(71) Applicants: Matthew L. Mitchell, Monte Sereno, CA (US); Zhong Pan, San Jose, CA (US); Michael F. Van Leeuwen, Bethesda, MD (US)

(72) Inventors: Matthew L. Mitchell, Monte Sereno, CA (US); Zhong Pan, San Jose, CA (US); Michael F. Van Leeuwen, Bethesda, MD (US)

(73) Assignee: Infinera Corporation, Sunnyvale, CA (US)

( * ) Notice: Subject to any disclaimer, the term of this patent is extended or adjusted under 35 U.S.C. 154(b) by 4 days.

(21) Appl. No.: 14/145,768

(22) Filed: Dec. 31, 2013

(65) Prior Publication Data

US 2015/0188276 A1 Jul. 2, 2015

(51) Int. Cl.

| | |
|---|---|
| ***H04J 14/02*** | (2006.01) |
| ***H01S 3/00*** | (2006.01) |
| ***H01S 3/067*** | (2006.01) |

(52) U.S. Cl.
CPC ........... *H01S 3/0078* (2013.01); *H01S 3/06754* (2013.01); *H04J 14/0201* (2013.01)

(58) Field of Classification Search
CPC .... H01S 3/0078; H01S 3/06754; H04J 14/02; H04J 14/0201
USPC ............................................ 359/337; 398/79
See application file for complete search history.

(56) References Cited

U.S. PATENT DOCUMENTS

| | | | | |
|---|---|---|---|---|
| 2003/0099015 | A1* | 5/2003 | Kelly et al. | 359/127 |
| 2012/0201543 | A1* | 8/2012 | Inoue | 398/83 |
| 2013/0071104 | A1* | 3/2013 | Nakashima et al. | 398/3 |

* cited by examiner

*Primary Examiner* — Mark Hellner
(74) *Attorney, Agent, or Firm* — David L. Soltz

(57) ABSTRACT

Consistent with the present disclosure, optical filters are provided in a reconfigurable optical add-drop multiplexer (ROADM). In one example, groups of optical signals are amplified by corresponding erbium-doped fiber amplifiers (EDFAs) and supplied to each optical filter, which has a passband that includes the wavelengths associated with the received optical signal group. Light at wavelengths outside the passband of each optical filter, such as amplified stimulated emission (ASE) light generated by a respective EDFA, is significantly attenuated. Each optical signal group, after such amplification and filtering may then be switched and combined in a multicast switch before being directed toward a desired optical communication path. When, for example, first and second optical signal groups are combined, however, the first optical signal group is accompanied by little or no ASE light at the second optical signal group wavelengths. In addition, the second optical signal group is not accompanied by significant ASE light at the first optical signal group wavelengths. Accordingly, the first and second optical signal groups have less noise than would otherwise be present in the absence of the optical filters, and bit error rates associated with the optical signal groups are reduced.

20 Claims, 11 Drawing Sheets

1707-2
To WSS 1702
To WSS 1703
To WSS 1705
2005-1
2005-2
2005-3
2010-1
2010-2
2010-3
MCS
2006
F
F
F
2007-1
2007-2
2007-3
2009-1
2009-2
2009-3
2011-1
2011-2
2011-3
T
T
T
2013-1
2013-2
2013-3
2015-1
2015-2
2015-3

1707-1
From WSS 1701
From WSS 1704
From WSS 1706
2003-1
2003-2
2003-3
MCS
2002
Rx
Rx
Rx
2001-1
2001-2
2001-3

MULTIPLEXER HAVING ASE SUPPRESSION

BACKGROUND

In an optical communication system, optical signals are modulated to carry data and transmitted on an optical communication path, including an optical fiber, for example, from a transmit node to a receive node. At the receive node, the data is detected and provided to a user, for example. In wavelength division multiplexed (WDM) optical communication systems, multiple modulated optical signals, each having a corresponding wavelength, are transmitted from the transmit node to the receive node along the optical fiber.

In point-to-point WDM optical communication systems, all the optical signals output from the transmit node propagate along a single fiber optic link and are terminated at the receive node. However, optical communications including multiple links that are interconnected with one another have been deployed that have greater capacity and flexibility. At nodes interconnecting two or more links, optical signals may be dropped and may be sensed by optical receivers. Additional optical signals, often having the same wavelengths as the dropped optical signals, may be added or transmitted to another node. An optical add/drop multiplexer may be provided at a node interconnecting multiple links in order to facilitate such adding and dropping of optical signals from one link to another.

In certain optical add/drop multiplexers, the optical signals that are added and dropped is fixed. That is, the optical signals are typically not changed once the optical add/drop multiplexer has been deployed. Other add/drop multiplexers, however, are reconfigurable in that the number optical signals that can be added and/or dropped can be changed. Such reconfigurable optical add-drop multiplexers (ROADMs) may be provided where multiple optical fiber links converge, and a user desires to add and drop optical signals depending on capacity requirements of the WDM system and/or other parameters.

ROADMs may include banks of optical transmitters and receivers that provide the added optical signals and the dropped optical signals, respectively. In high capacity systems, individual signals may be grouped into so-called "super-channels" that are routed through the optical communication system as a single unit. The transmitters, outputting such optical signal groups, may be coupled to a switch, which may include individual switches that selectively direct the optical signal groups supplied by the transmitters to particular optical combiners or multiplexers. The optical combiners, in turn, combine those selected optical signal groups, which have been designated to be added to a given optical communication path. The switches may also direct other optical signals to other combiners that direct such other optical signals to another optical communication path, for example.

The added optical signal groups may incur a loss, however, while propagating through the optical combiners, as well as other optical components in the switch. Accordingly, optical amplifiers, such as erbium doped fiber amplifiers, may be provided in the ROADM to boost the power of the optical signals and thus offset the incurred loss.

Erbium doped fiber amplifiers (EDFA) often generate amplified stimulated emission (ASE) light at wavelengths other than the optical signal wavelengths. Such ASE light is generally regarded as noise, which should be minimized in order to accurately detect the optical signals in the receiver. In the optical combiners, in which first and second groups of optical signals are to be added, however, the ASE light generated by a first EDFA amplifying the first group of optical signal may also be present at wavelengths corresponding to the second optical signals. Thus, when such ASE light is combined with the second optical signals in the multi-cast switch, the signal quality (e.g., the optical signal-to-noise ratio, OSNR) of the second group of the optical signals is undesirably decreased. As a result, the number of errors, e.g., the bit error rate, of the second group of optical signals may increase. Likewise, the bit error rate of optical signals in the first group may also increase due to ASE at the first optical signal wavelengths generated by a second EDFA that amplifies the second group of optical signals.

Although the OSNR associated with the combined optical signal groups may be acceptable if the optical signal groups propagate over relatively short distances, the OSNR may increase to unacceptable levels after transmission over longer distances. Accordingly, the reach or transmission distance of such combined optical signal groups is limited.

SUMMARY

Consistent with an aspect of the present disclosure, ASE light is suppressed in a mult-cast switch based multiplexing structure. Further, an apparatus is provided that includes a first plurality of transmitters, each of which providing a corresponding one of a first plurality of optical signals. Each of the the first plurality of optical signals has a corresponding one of a first plurality of wavelengths. In addition, a second plurality of transmitters is provided. Each of which providing a second plurality of optical signals, each of which having a corresponding one of a second plurality of wavelengths. The apparatus further includes a first optical amplifier that receives the first plurality of optical signals, and a second optical amplifier that receives the second plurality of optical signals. The first optical amplifier generates first amplified stimulated emission (ASE) over a first range of wavelengths, and the second optical amplifier generates second ASE over a second range of wavelengths. The first plurality of optical signals are within the second range of wavelengths and the second plurality of optical signals are within the first range of wavelengths. Moreover, the apparatus includes a first filter that attenuates the first ASE and a second filter that attenuates the second ASE. Further, the apparatus includes an optical combiner that receives the first plurality of optical signals from the first optical amplifier and the second plurality of optical signals from the second optical amplifier and combines the first and second pluralities of optical signals onto an output.

Consistent with a further aspect of the present disclosure, a system is provided that comprises a first plurality of transmitters, each of which providing a corresponding one of a first plurality of optical signals. Each of the first plurality optical signals has a corresponding one of a first plurality of wavelengths. A second plurality of transmitters is also provided, each of which providing a second plurality of optical signals. Each of the second plurality of optical signals has a corresponding one of a second plurality of wavelengths. The apparatus further includes a first optical combiner that combines the first and second pluralities of optical signals onto an optical communication path and an add-drop multiplexer coupled to the optical communication path. The add-drop multiplexer includes a drop module that outputs the first and second pluralities of optical signals and an add module. The add-drop multiplexer also includes a third plurality of transmitters, each of which providing a corresponding one of a third plurality of optical signals. Each of the third plurality of optical signals has a corresponding one of the first plurality of wavelengths. A fourth plurality of transmitters is also provided, each of which providing a corresponding one of a fourth plurality of optical signals. Each of the fourth plurality of optical signals has a corresponding one of the second plurality of wavelengths. The add-drop multiplexer also has a first optical amplifier that receives the third plurality of optical signals, and a second optical amplifier that receives the fourth plurality of optical signals. The first optical amplifier generates first amplified stimulated emission (ASE) over a first range of wavelengths, and the second optical amplifier generating second ASE over a second range of wavelengths. The third plurality of optical signals is within the second range of wavelengths and the fourth plurality of optical signals is within the first range of wavelengths. Further, a first filter is provided that attenuates the first ASE and a second filter that attenuates the second ASE. Moreover, a second optical combiner is provided that receives the third plurality of optical signals from the first optical amplifier and the fourth plurality of optical signals from the second optical amplifier and combines the third and fourth pluralities of optical signals onto an output waveguide. In addition, the second optical combiner supplies the combined third and fourth pluralities of optical signals to the add module, which provides the combined third and fourth pluralities of optical signals to the optical communication path.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Consistent with the present disclosure, optical filters are provided in a reconfigurable optical add-drop multiplexer (ROADM). In one example, groups of optical signals are amplified by corresponding erbium-doped fiber amplifiers (EDFAs) and supplied to each optical filter, which has a passband that includes the wavelengths associated with the received optical signal group. Light at wavelengths outside the passband of each optical filter, such as amplified stimulated emission (ASE) light generated by a respective EDFA, is significantly attenuated. Each optical signal group, after such amplification and filtering may then be switched and combined in a multicast switch before being directed toward a desired optical communication path. When, for example, first and second optical signal groups are combined, however, the first optical signal group is accompanied by little or no ASE light at the second optical signal group wavelengths. In addition, the second optical signal group is not accompanied by significant ASE light at the first optical signal group wavelengths. Accordingly, the first and second optical signal groups have less noise than would otherwise be present in the absence of the optical filters, and bit error rates associated with the optical signal groups are reduced.

Reference will now be made in detail to the present embodiments of the present disclosure, examples of which are illustrated in the accompanying drawings. Wherever possible, the same reference numbers will be used throughout the drawings to refer to the same or like parts.

Figure 1A:
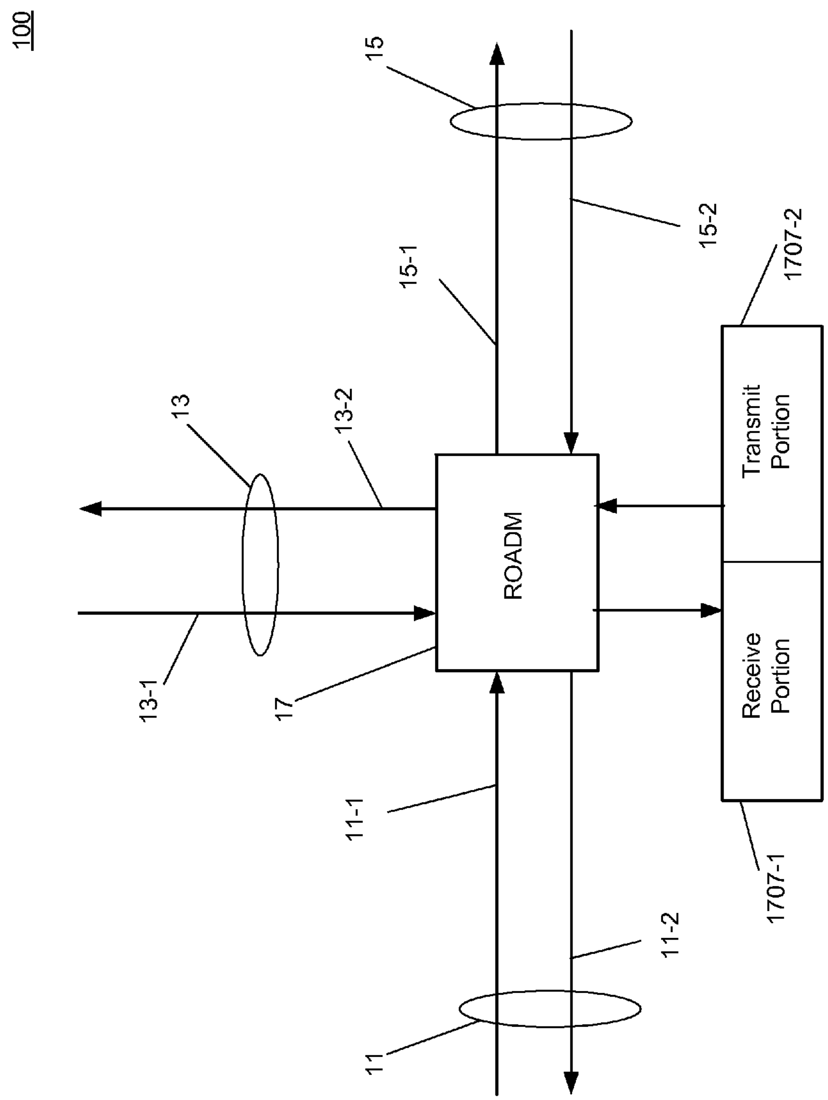
FIG. 1*a* illustrates a block diagram of a ROADM site consistent with the present disclosure.

FIG. 1*a* illustrates an example of a ROADM site 100 that interconnects optical fiber links 11, 13, and 15 via ROADM 17. Fiber links may include optical fiber pairs, wherein each fiber of the pair carries optical signal groups propagating in opposite directions. As seen in FIG. 1*a*, for example, optical fiber link 11 includes a first optical fiber 11-1, which carries optical signals toward ROADM 17, and a second optical fiber 11-2 that carries optical signals output from ROADM 17. Similarly, optical fiber link 13 may include optical fibers 13-1 and 13-2 carrying optical signal groups to and from ROADM 17, respectively. Further, optical fiber link 15 may include first (15-1) and second (15-2) optical fibers also carrying optical signals from and to ROADM 17, respectively. Additional nodes, not shown in FIG. 1*a*, may be provided that supply optical signal groups to and receive optical signal groups from ROADM 17. Such nodes may also have a ROADM having the same or similar structure as that of ROADM 17.

As further shown in FIG. 1*a*, transmit (1707-2) and receive (1707-1) portions may be provided adjacent ROADM 17 to add and drop optical signal groups, respectively.

Figure 1B:
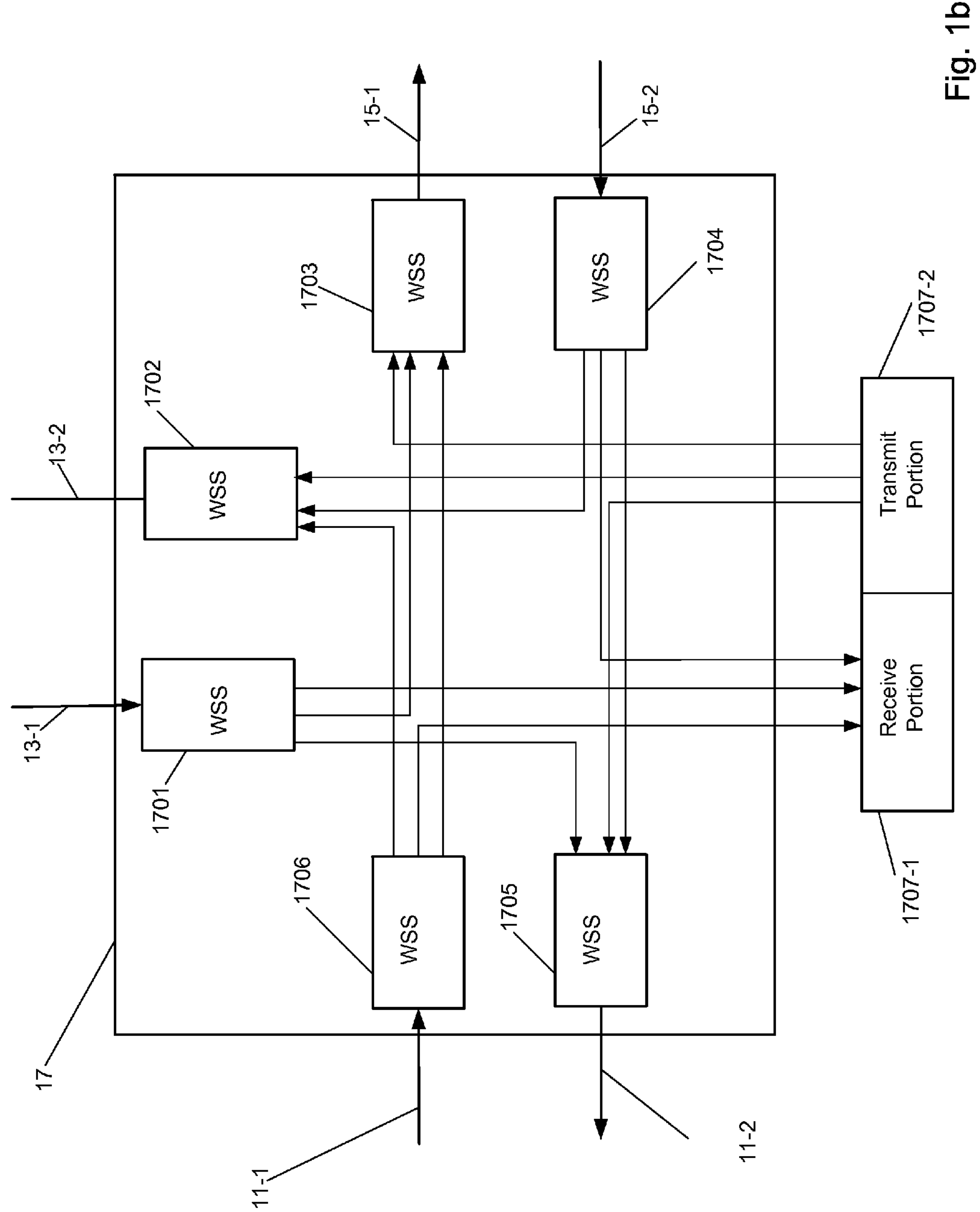
FIG. 1*b* illustrates an example of a ROADM.

ROADM 17 and transmit (1707-2) and receive (1707-1) portions will next be described in greater detail with reference to FIGS. 1*b* and 2(*a*)-2(*d*). As shown in FIG. 1*b*, ROADM 17 may include a plurality of wavelength selective switches (WSSs), such as WSSs 1701 to 1706. Wavelength selective switches are known components that can dynamically route, block and/or attenuate all the received optical signal groups input from and output to optical fiber links 11, 13, and 15. In addition to transmitting/receiving optical signal groups from these nodes, optical signal groups may also be input from or output to transmit and receive portions 1707-1 and 1707-2, respectively, in or near ROADM 17.

As further shown in FIG. 1*b*, each WSS can receive optical signal groups and selectively direct such optical signal groups to other WSSs for output from ROADM 17. For example, WSS 1706 may receive optical signal groups on optical communication path 11-1 and supply certain optical signal groups to WSS 1703, while other are supplied to WSS 1702. Those supplied to WSS 1703 may be output to node 18 on optical communication path 1703, while those supplied to WSS 1702 may be output to node 19. Also, optical signal groups input to ROADM 17 on optical communication path 15-2 may be supplied by WSS 1704 to either WSS 1705 and on to node 11 via optical communication path 11-2 or WSS 1702 and on to node 19 via optical communication path 13-2. Moreover, WSS 1701 may selectively direct optical signal groups input to ROADM 17 from node 19 to either WSS 1705 and onto node 11 via optical communication path 11-2 or to WSS 1703 and onto node 18 via optical communication path 15-1.

WSSs 1701, 1704, and 1706 may also selectively or controllably supply optical signal groups to receive portion 1707-1 and optical signal groups may be selectively output from transmit portion 1707-2 in ROADM 17. The optical signal groups output from transmit portion 1707-2 may be selectively supplied to one or more of WSSs 1703, 1702, and 1705, for output on to optical communication paths 15-1, 13-2, and 11-2, respectively.

Figure 2B:
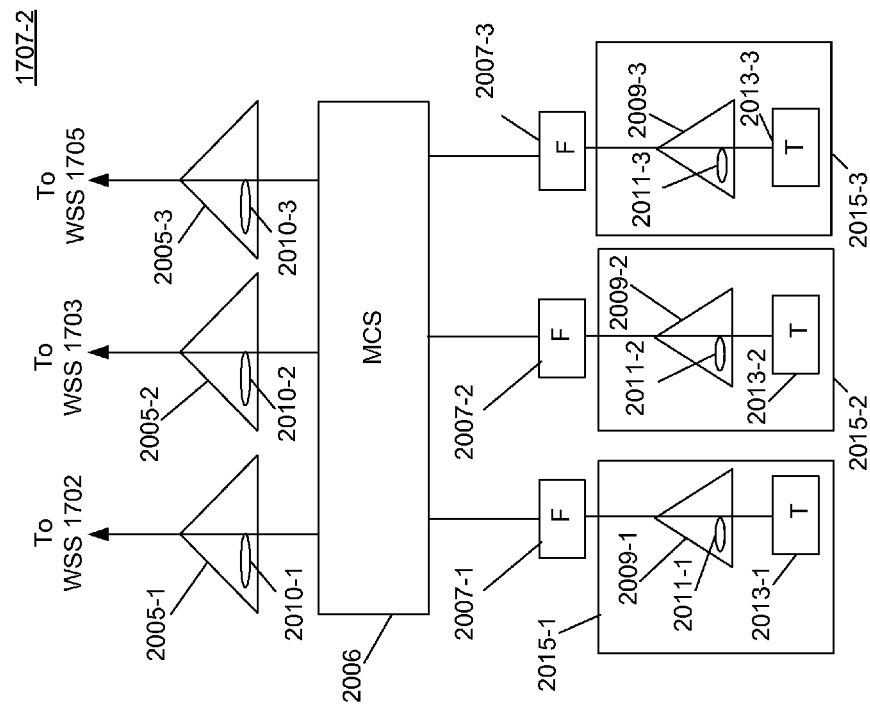
FIGS. 2*a*-2*d* illustrate the features of FIG. 1*b* in greater detail.
Figure 2A:
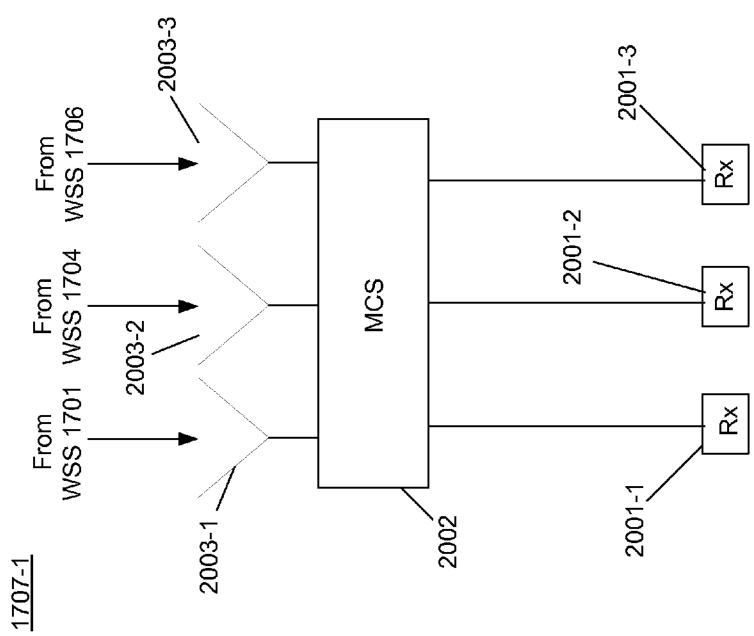

Transmit and receive portion 1707-2/1707-1 are shown in greater detail in FIG. 2*a*. Receive portion 1707-1 includes optical amplifiers 2003-1 to 2003-3 that receive optical signal groups from WSSs 1701, 1704, and 1706, respectively. The optical amplifiers, may each include a segment of erbium doped fiber, which may be pumped to provide gain for the received optical signal groups. The amplified optical signal groups may then be supplied to a multi-cast switch (MCS) 2002, which controllably directs the received optical signals to one of receivers (Rx) 2001-1 to 3001-3.

Figure 2C:
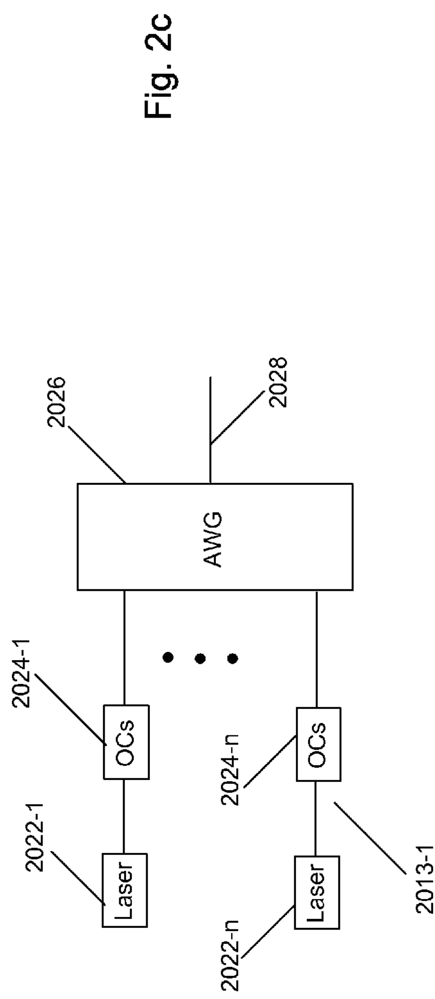
Figure 2D:
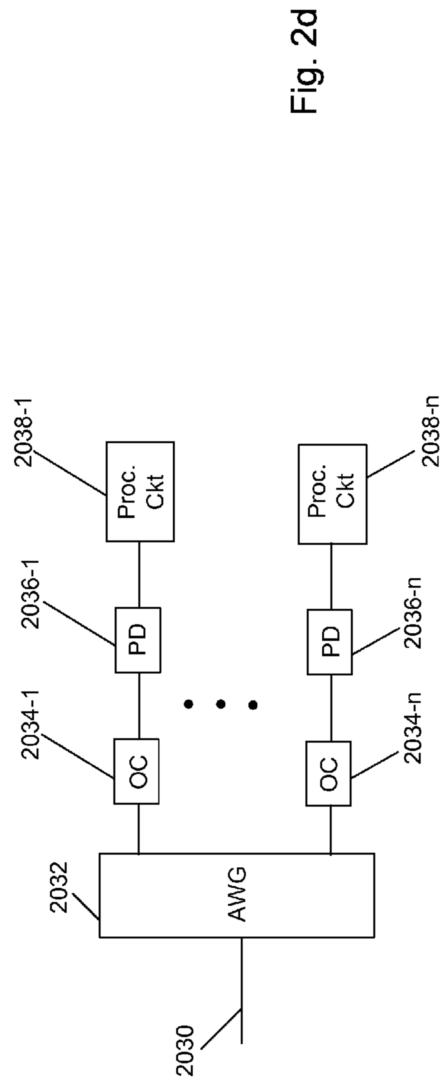

One of receivers 2001-1 is shown in greater detail in FIG. 2*c*. Receiver 2001-1 has an input 2030 that receives an optical signal group and supplies the optical signal group to a demultiplexer, such as arrayed waveguide grating (AWG) 2032. AWG 2032 may separate the optical signals within the received group based on wavelength and supply each optical signal to a corresponding one of the optical components 2034-1 to 2034-*n*. As noted above, the optical signals may be polarization multiplexed, such that a polarization splitter or decombiner may be provided in each receiver the separate the TE and TM components, for example, of each optical signal. The TE and TM components may then be processed separately. As further noted above, the TE and TM components may be modulated in accordance with an m-ary modulation format (m being an integer greater than or equal to 1), e.g., binary phase shift keying (BPSK), quadrature phase shift keying (QPSK), 8-QAM, 16-QAM or higher data rate modulation format, such that each is preferably subject to coherent detection to effectively demodulate and detect the data carried by each optical signal. Here, optical components 2034-1 to 2034-*n* may each include known optical hybrid circuitry, as well as a local oscillator laser, and the outputs of optical components 2034-1 to 2034-*n* may be supplied to respective photodetector circuitry (PDs) 2036-1 to 2036-*n*. The optical signals may then be converted to corresponding electrical signals by PDs 2036-1 to 2036-*n*, each of which may include known balanced detectors. The electrical signals output from PDs 2036-1 to 2036-*n* are then provided to processing circuits 2038-1 to 2038-*n*, each of which includes known clock and data recovery circuitry to demodulate and output data carried by the optical signals in the optical signal group supplied to AWG 2032.

It is understood that receivers 2001-2 to 2001-3 may have the same or similar structure as that shown in FIG. 2*c*. One or more of the components shown in FIG. 2*c*, such as AWG 2032, OCs 2034-1 to 2034-*n*, PDs, 2036-1 to 2036-*n* may optionally be provided on a common semiconductor substrate.

Returning to FIG. 2*b*, transmit portion 1707-2 will next be described in greater detail. Transmit portion 1707-2 includes a transmitters 2013-1 to 2013-3, each of which supplying a corresponding optical signal group to a respective one of optical amplifiers 2009-1 to 2009-3. FIG. 2*b* shows transmitter 2013-1 in greater detail. It is understood that transmitters 2013-2 and 2013-3 may have the same or similar structure as transmitter 2013-1.

As shown in FIG. 2*b*, transmitter 2013-1 includes a plurality of lasers 2022-1 to 2022-*n*, each of which supplying a corresponding unmodulated optical signal having a particular wavelength to a respective one of optical circuits 2024-1 to 2024-*n*. Each optical circuit 2024-1 to 2024-*n* may include optical modulators, splitters, polarization rotators, amplifiers, and other optical components for modulating, amplifying, and/or polarization multiplexing portions of the light output from each laser 2022-1 to 2022-*n*. Modulated optical signals output from each optical circuit 2024-1 to 2024-*n* are next combined by a known optical multiplexer, such as AWG 2026 onto an output waveguide 2028 as an optical signal group. Laser 2022-1 and optical circuit 2024-1 may collectively constitute a first optical source. Similarly, laser 2022-2 and optical circuit 2024-2 may also collectively constitute a second optical source, as well as laser 2022-3 and optical circuit 2024-3 collectively constituting a third optical source.

As noted above, in one example, the modulated optical signals may be polarization multiplexed, such that TE and TM components of each optical signal are separately modulated and combined. In that case, one or more polarization beam combiners may be provided in each transmitter to combine such components. In addition, known optical circuitry may be provided to modulate the TE and TM components in accordance with an m-ary modulation format, such as BPSK, QPSK, 8-QAM, 16-QAM or higher data rate modulation format.

It is noted that each optical signal within each optical signal group discussed above may have a wavelength near 1550 nm.

Returning to FIG. 2*b*, each optical amplifier 2009-1 to 2009-3 includes a corresponding segment of erbium doped fiber (2011-1 to 2011-3), which as noted above, can be pumped to provide gain over a range of wavelengths, including the wavelengths of optical signals in the optical signal groups output from transmitters 2013-1 to 2013-3. Transmitters 2013-1 to 2013-3 and optical amplifiers 2011-1 to 2011-3 may be provided in respective modules 2015-1 to 2015-3. Each of modulates 2015-1 to 2015-3 may be a line card, for example.

The amplified optical signal groups may next be supplied to a corresponding one of filters 2007-1 to 2007-3 and then provided to a multi-cast switch (MCS) 2006, which switches the received optical signal groups to one of amplifiers 2005-1 to 2005-3, each of which including a corresponding one of erbium-doped fibers 2010-1 to 2010-3. Each optical amplifier, in turn, outputs the received optical signal groups, in amplified form, to a corresponding one of WSSs 1702, 1703, and 1705. Thus, MCS 2006 may be controlled to output a particular optical signal group to a desired WSS, and then onto a desired node. As a result, of such switching, node 17 is reconfigurable so that each optical signal group can be selectively or controllably output to any desired output, and thus to a desired node.

Figure 3:
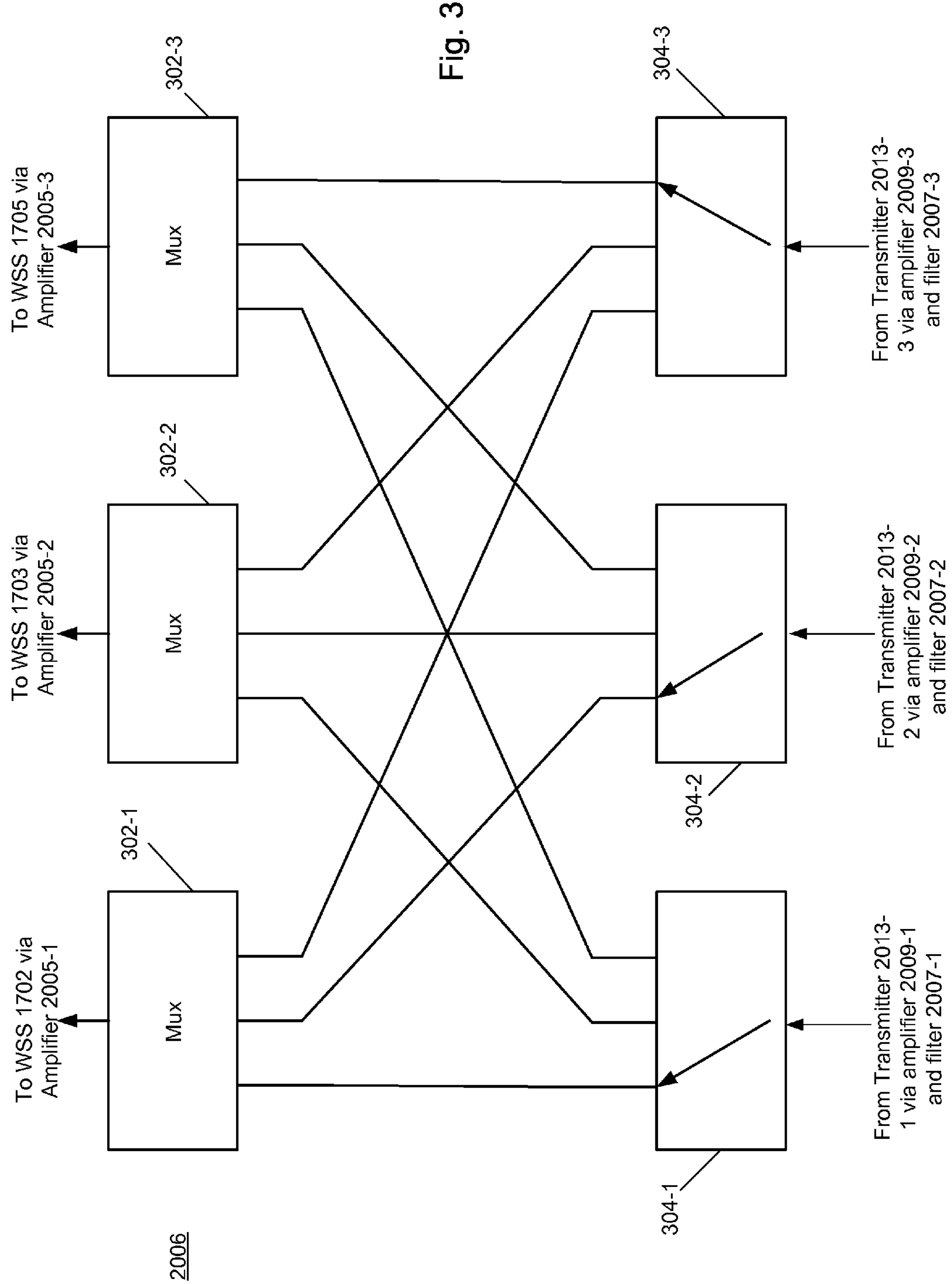
FIG. 3 illustrates an example of a multi-cast switch consistent with the present disclosure.

MCS 2006 is shown in greater detail in FIG. 3. MCS 2006 includes optical switches 304-1 to 304-3, each of which being configured to direct a received optical signal group from a respective one of transmitters 2013-1 to 2013-3 (via a corresponding one of optical amplifiers 2009-1 to 2009-3) to one of optical multiplexer or power combiners 302-1 to 302-3. In the exemplary configuration shown in FIG. 3, optical switch 304-3 is configured to supply an optical signal group from transitter 2013-3 to multiplexer 302-3. In addition, optical switches 304-1 and 304-2 are configured to direct optical signal groups from transmitters 2013-1 and 2013-2, respectively, to multiplexer 302-1. Optical multiplexer 302-1 may be a known optical combiner, that passively combines light over a relatively wide range of wavelengths. The combined optical signal groups may then be output from MCS 2006, as noted above.

Figure 4A:
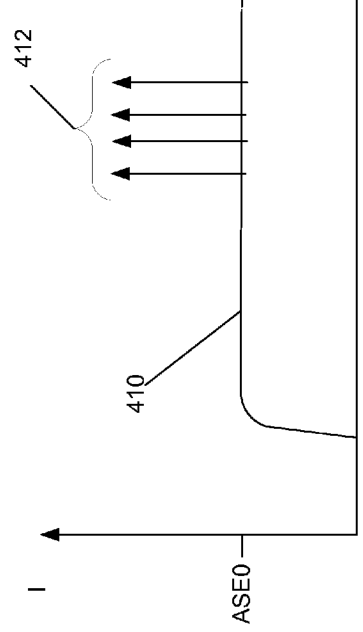
FIGS. 4*a* and 4*b* show power spectra associated with the outputs of first and second optical amplifiers.
Figure 4C:
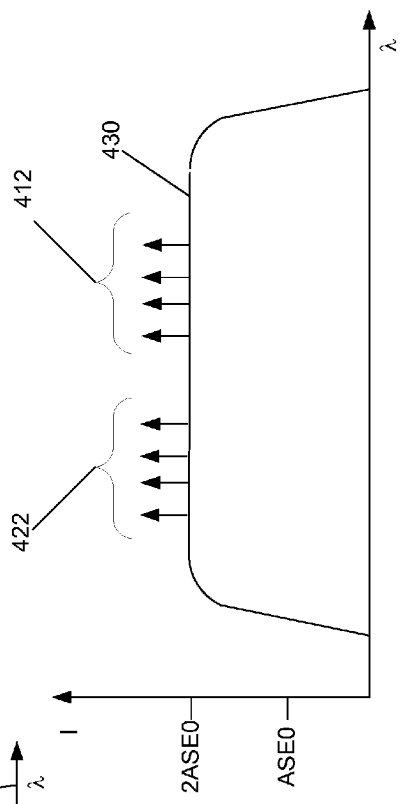
FIG. 4*c* illustrates a combined power spectra when the outputs having the power spectra shown in FIGS. 4*a* and 4*b* are combined.
Figure 4B:
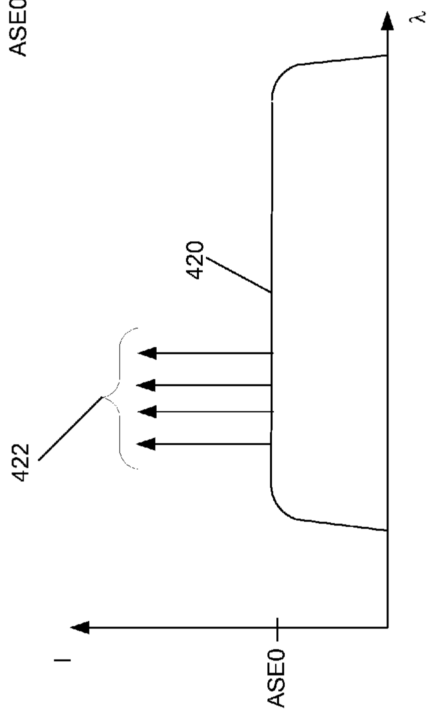

FIGS. 4(*a*) to 4(*c*) illustrates the results of such power combining in the absence of a filter, such as filters 2007-1 and 2007-2, at the input of MCS 2006. FIG. 4*a* illustrates a power spectrum of light output from optical amplifier 2009-1, and FIG. 4*b* illustrates a power spectrum of light output from optical amplifier 2009-2. Arrows 412 in FIG. 4*a* represent an optical signal group output from transmitter 2013-1, and arrows 422 in FIG. 4*b* represent an optical signal group output from transmitter 2013-2. Although optical amplifier 2009-1 provides gain and amplification at wavelengths corresponding to optical signal group 412, the optical amplifier also generate spurious light or noise, otherwise referred to as amplified stimulated emission (ASE), at wavelengths outside the range of wavelengths corresponding to the amplified optical signal group 412. For example, ASE spectrum 410 has a peak power or intensity (I) level ASE0 that extends over a range of wavelengths associated with optical signal group 422. Similarly, ASE spectrum 420 of optical amplifier 2009-2 extends over a range of wavelengths associated with optical signal group 412 and has a peak intensity value of ASE0. When the outputs of optical amplifiers 2009-1 and 2009-2 are combined in multiplexer 302-1, for example, the ASE levels ASE0 are added so that the total ASE supplied from multiplexer 302-1 is greater than and approximately twice (2ASE0) that at the output of optical amplifiers 2009-1 and 2009-2 (see FIG. 4(*c*)). Such increased ASE reduces the signal-to-noise ratio (SNR) at the output of multiplexer 302-1 and can lead to signal degradation and a relatively high bit error rate.

Figure 5A:
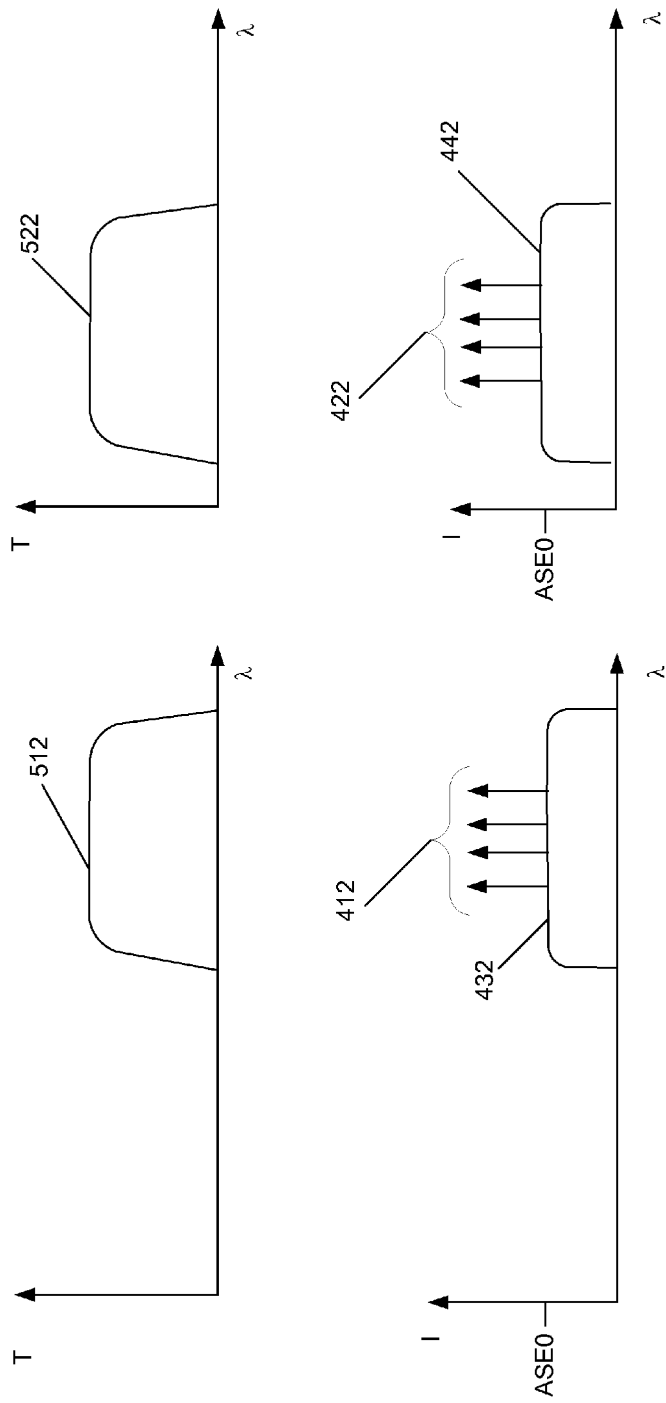
FIG. 5*a* illustrates passbands associated with optical filters in accordance with an aspect of the present disclosure, as well the power spectra of filtered outputs of first and second optical amplifiers.
Figure 5B:
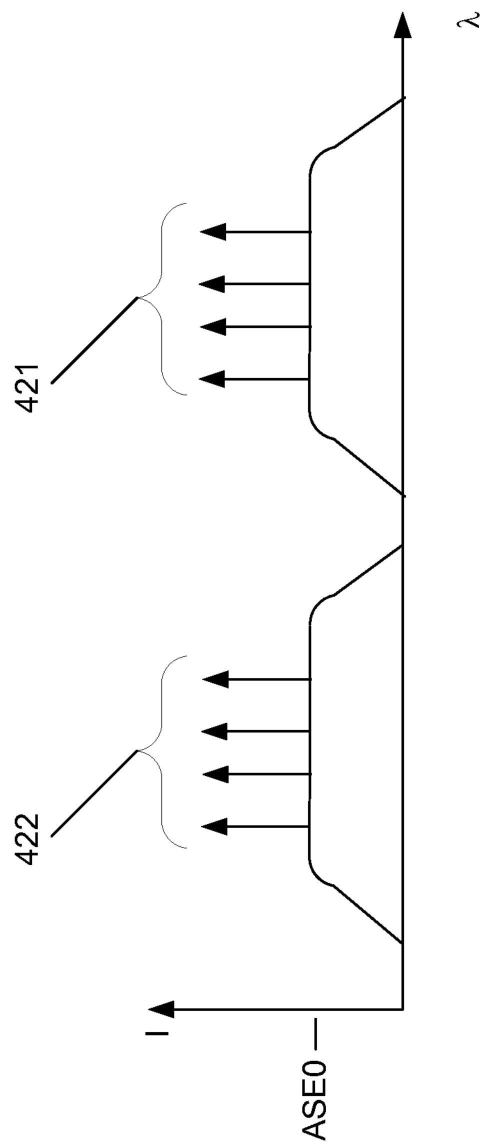
FIG. 5*b* illustrates a combined power spectra when the filtered outputs having the power spectra shown in FIG. 5*a* are combined.

Consistent with the present disclosure, however, optical filters, such as filters 2009-1 and 2009-2 may be provided that have passbands 512 and 522 that have a high, preferably near 100% transmission over a range of wavelengths or bandwidth that corresponds to optical signal groups 412 and 422, respectively. As shown in FIG. 5*a*, optical filters 2009-1 and 2009-2, however, have relatively low transmission, preferably near 0% for at wavelengths outside each respective passbands 512 and 522. Accordingly, as shown in FIG. 5*b* (which shows the output spectrum of multiplexer 302-1 when filters 2009-1 and 2009-2 are present), ASE outside the passband 512 at wavelengths corresponding to optical signal group 422 is attenuated. Similarly, ASE outside passband 522 corresponding to optical signal group 412 is also attenuated. Optical signal groups 412 and 422 may thus be combined in multiplexer 302-1 without the additional ASE0 noted above, such that the amount of ASE associated with each optical signal group may be reduced by approximately half (ASE0) compared to the configuration in which the filters are not present.

Figure 6:
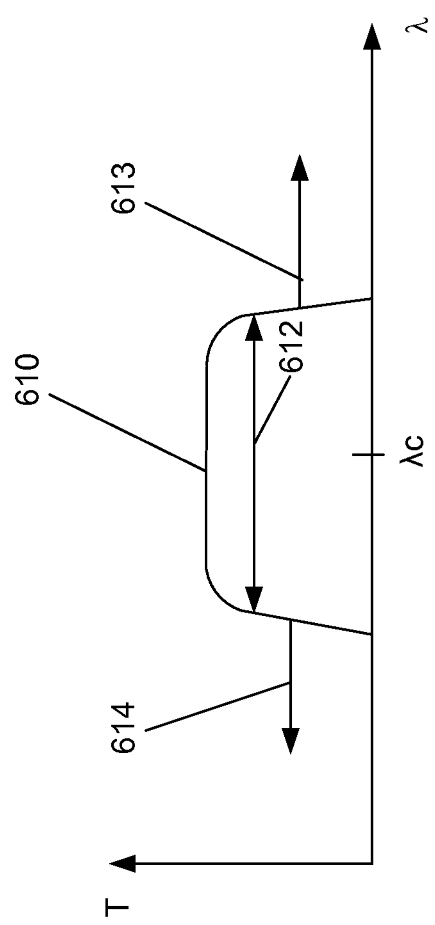
FIG. 6 illustrates a transmission spectrum of a tunable filter consistent with the present disclosure.

Filters 2009-1 to 2009-3 may include any one of a variety of know filters. Preferably, however, each filter has a tunable passband 610 (see the transmission spectrum shown in FIG. 6) that can be spectrally shifted in wavelength in response to a control signal. That is, the center wavelength of passband 610, λc, can be increased or decreased, as indicated by arrows 613 and 614. Further, the width of passband 610 is preferably also adjustable or tunable, as indicated by arrow 612. As a result, the same type of filter may be provided for each of filters 2009-1 to 2009-3, each tuned to have a desired passband, instead of a custom filter for each. Accordingly, manufacturing costs may be reduced compared to an implementation in which custom filters are provided. Alternatively, different filters, each having a fixed passband, may be provided.

Figure 7:
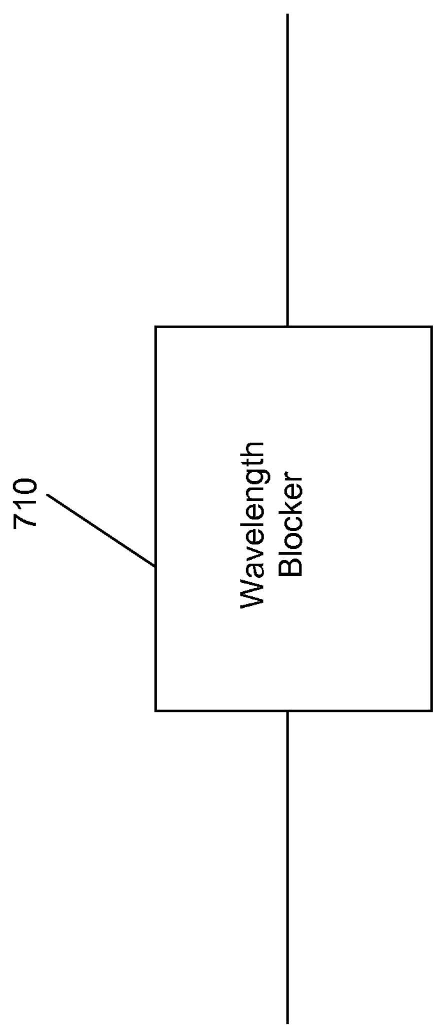
FIGS. 7 and 8 illustrate examples of tunable filters consistent with the present disclosure.
Figure 8:
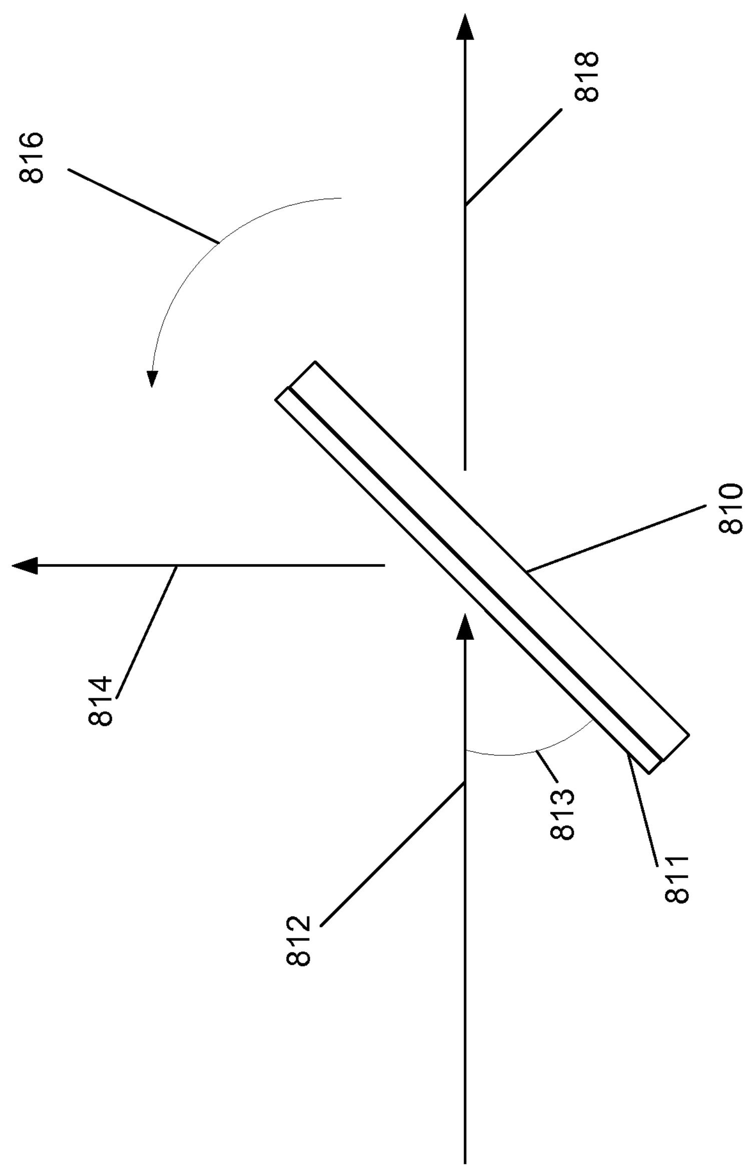

FIG. 7 shows a first example of a filter that may be provided consistent with the present disclosure. Here, filters 2009-1 to 2009-3 may be realized with a wavelength blocker 710, commercially available from Finisar Corporation or JDSU Corporation. In the example shown in FIG. 8, dichroic filter 810 that may be rotated in a direction indicated by arrow 816. Angle of incidence 813 of incoming light 812 determines the effective thickness of a coating 811 of filter 810. As generally understood, different thicknesses have associated passbands that can either change in width or shift in wavelength. Accordingly, by rotating filter 810 to an appropriate position, a desired passband over a desired range of wavelengths can be obtained.

In another embodiment, each filter may include a digital light processing device, generally referred to as a DLP device.

The number of wavelengths and other components discussed above are exemplary only. Any appropriate number of filters, WSSs, optical switches, for example, or other optical components discussed above are contemplated to accommodate any appropriate number of optical signals and/or optical signal groups.

Other embodiments will be apparent to those skilled in the art from consideration of the specification. For example, although filters 2007-1 to 2007-3 are provided outside of modules 2011-1 to 2011-3, respectively, each filter may be provided within a corresponding module. It is intended that the specification and examples be considered as exemplary only, with a true scope and spirit of the invention being indicated by the following claims.

What is claimed is:

1. An apparatus, comprising:

a first plurality of optical sources, each of which providing a corresponding one of a first plurality of optical signals, each of which having a corresponding one of a first plurality of wavelengths;

a second plurality of optical sources, each of which providing a second plurality of optical signals, each of which having a corresponding one of a second plurality of wavelengths;

a first optical amplifier that receives the first plurality of optical signals;

a second optical amplifier that receives the second plurality of optical signals, the first optical amplifier generating first amplified stimulated emission (ASE) over a first range of wavelengths, and the second optical amplifier generating second ASE over a second range of wavelengths, the first plurality of optical signals being within the second range of wavelengths and the second plurality of optical signals being within the first range of wavelengths;

a first filter that attenuates the first ASE and a second filter that attenuates the second ASE; and an optical combiner that receives the first plurality of optical signals from the first optical amplifier and the second plurality of optical signals from the second optical amplifier and combines the first and second pluralities of optical signals onto an output.

2. An apparatus in accordance with claim 1, further including first and second modules, wherein the first plurality of optical sources, the first optical amplifier, and the first filter are housed in the first module and the second plurality of optical sources, the second filter and the second optical amplifier are housed in the second module.

3. An apparatus in accordance with claim 1, further including a first switch and a second switch, the first switch having an input and a plurality of outputs, and the second switch having an input and a plurality of outputs, the first plurality of optical signals being provided to the input of the first switch and second plurality of optical signals being provided to the input of the second switch, the first plurality of optical signals being selectively supplied, by the first switch, to one of the plurality of outputs of the first switch and the second plurality of optical signals being selectively supplied, by the second switch, to one of the plurality of outputs of the second switch, said one of the plurality of outputs of the first switch directing the first plurality of optical signals to the optical combiner, and said one of the plurality of outputs of the second switch directing the second plurality of optical signals to the optical combiner.

4. An apparatus in accordance with claim 1, wherein the first optical amplifier includes a first segment of erbium-doped optical fiber and the second optical amplifier includes a second segment of erbium-doped optical fiber.

5. An apparatus in accordance with claim 1, wherein the first filter has a first bandwidth that is fixed and the second filter has a second bandwidth that is fixed.

6. An apparatus in accordance with claim 5, wherein the first filter includes a first thin film filter and the second filter includes a second thin film filter.

7. An apparatus in accordance with claim 1, wherein the first filter has a first bandwidth that is variable and the second filter has a second bandwidth that is variable.

8. An apparatus in accordance with claim 7, wherein the first filter includes a first wavelength blocker and the second filter includes a second wavelength blocker.

9. An apparatus in accordance with claim 7, wherein the first filter includes a first rotatable thin film filter and the second filter includes a second rotatable thin film filter.

10. An apparatus in accordance with claim 7, wherein the first filter includes a first grating and the second filter includes a second grating.

11. An apparatus in accordance with claim 7, wherein the first filter includes a first digital light processing (DLP) device and the second filter includes a second DLP device.

12. An apparatus in accordance with claim 1, further including a third optical amplifier that receives the first and second pluralities of optical signals from the optical combiner.

13. An apparatus in accordance with claim 1, further including a wavelength selective switch that receives the first and second pluralities of optical signals from the output.

14. An apparatus, comprising:

a first plurality of optical sources, each of which providing a corresponding one of a first plurality of optical signals, each of which having a corresponding one of a first plurality of wavelengths;

a second plurality of optical sources, each of which providing a second plurality of optical signals, each of which having a corresponding one of a second plurality of wavelengths;

a first optical amplifier that receives the first plurality of optical signals;

a second optical amplifier that receives the second plurality of optical signals, the first optical amplifier generating first amplified stimulated emission (ASE) over a first range of wavelengths, and the second optical amplifier generating second ASE over a second range of wavelengths, the first plurality of optical signals being within the second range of wavelengths and the second plurality of optical signals being within the first range of wavelengths;

a first filter that attenuates the first ASE and a second filter that attenuates the second ASE;

a first switch and a second switch, the first switch having an input and a plurality of outputs, and the second switch having an input and a plurality of outputs, the first plurality of optical signals being provided to the input of the first switch and second plurality of optical signals being provided to the input of the second switch, the first plurality of optical signals being selectively supplied, by the first switch, to one of the plurality of outputs of the first switch and the second plurality of optical signals being selectively supplied, by the second switch, to one of the plurality of outputs of the second switch;

a first optical combiner; and a second optical combiner, said one of the plurality of outputs of the first switch directing the first plurality of optical signals to the first optical combiner, and said one of the plurality of outputs of the second switch directing the second plurality of optical signals to the second optical combiner.

15. An apparatus in accordance with claim 14, wherein the first optical amplifier includes a first segment of erbium-doped optical fiber and the second optical amplifier includes a second segment of erbium-doped optical fiber.

16. An apparatus in accordance with claim 14, wherein the first filter has a first bandwidth that is fixed and the second filter has a second bandwidth that is fixed.

17. An apparatus in accordance with claim 14, wherein the first filter has a first bandwidth that is variable and the second filter has a second bandwidth that is variable.

18. An apparatus in accordance with claim 14, further including a third optical amplifier that receives the first plurality of optical signals from the first optical combiner.

19. An apparatus in accordance with claim 14, further including a wavelength selective switch that receives the first and second pluralities of optical signals from the first and second optical combiners, respectively.

20. An apparatus in accordance with claim 1, wherein the first filter is selected from the group consisting of: a wavelength blocker, a rotatable thin film filter, a digital light processing (DLP) device, and a grating.

* * * * *